April 14, 1942. G. A. LYON 2,279,331
ORNAMENTAL MEMBER FOR WHEEL
Filed Jan. 21, 1939 2 Sheets-Sheet 1
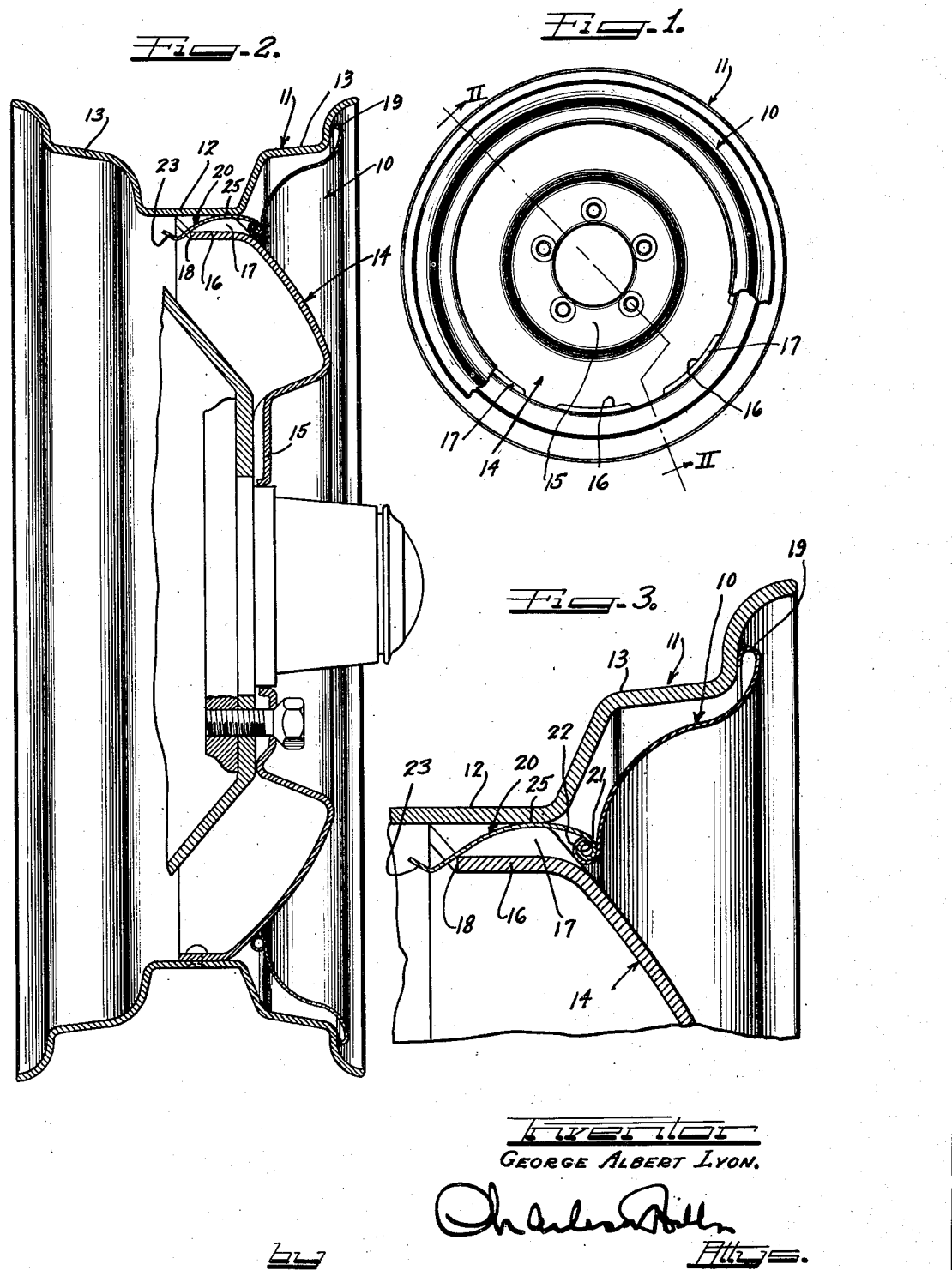
Inventor
GEORGE ALBERT LYON.

April 14, 1942. G. A. LYON 2,279,331
ORNAMENTAL MEMBER FOR WHEEL
Filed Jan. 21, 1939 2 Sheets-Sheet 2
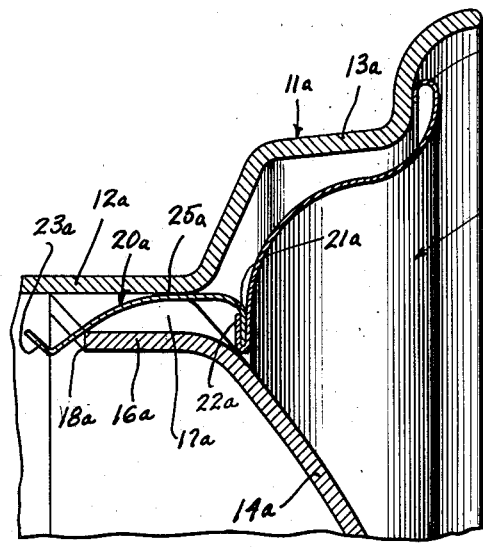
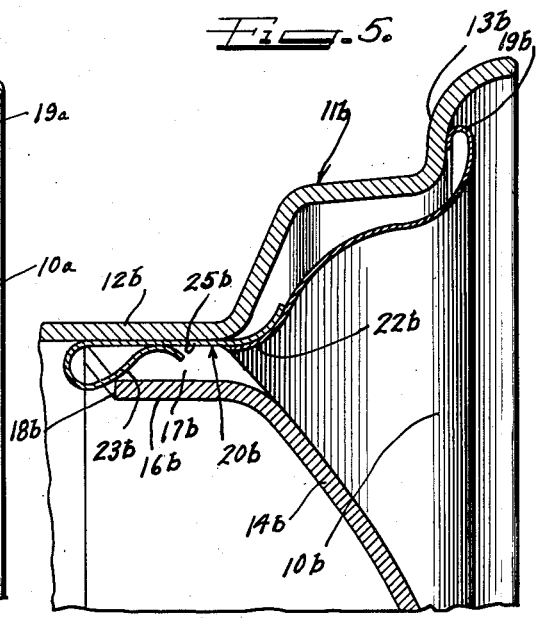
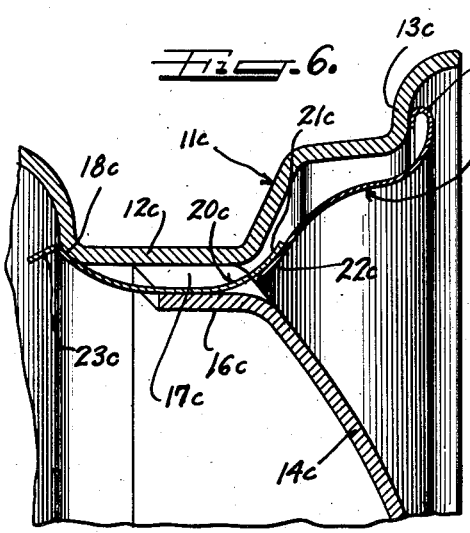
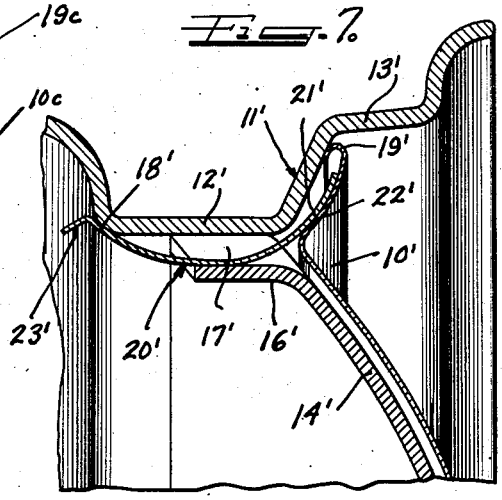
Inventor
GEORGE ALBERT LYON.

Patented Apr. 14, 1942

2,279,331

UNITED STATES PATENT OFFICE 2,279,331

ORNAMENTAL MEMBER FOR WHEELS

George Albert Lyon, Allenhurst, N. J.

Application January 21, 1939, Serial No. 252,096

5 Claims. (Cl. 41—10)

This invention relates to ornamental members for wheels and more particularly to an automobile wheel construction including a circular trim member adapted to be snapped into retaining cooperation with both the rim and body members of the wheel.

An object of the present invention is to provide in a wheel construction an ornamental member therefor with a highly inexpensive and simplified construction for resiliently and detachably securing the same in cooperation with both the rim and body members of the wheel.

Another object of this invention is to provide in an ornamented wheel construction a retaining means for the ornamental member of such construction that it may bear against one of the wheel members so as to have the benefit of the same as a backing and so that it may retainingly grip or engage the other member.

In accordance with the general features of this invention, there is provided in such a wheel construction wheel rim and body members with the rim member having the usual flanges and the body member having a plurality of circumferentially spaced openings adjacent the rim member and an ornamental circular member for disposition over an outer side of the wheel having a plurality of rearwardly extending resilient retaining fingers secured thereto and arranged to extend into the aforesaid openings, each of these fingers having an intermediate portion adapted to bear against one of said wheel members inside the cooperating opening and having a flexible portion formed for retaining engagement with a concealed shoulder on the other wheel member.

In accordance with other features of the invention, there are provided a number of different embodiments of the present invention in which slightly different modified forms of spring elements are employed, some of which bear against the rim member and retainingly grip the wheel body member and others of which bear against the body member and resiliently grip the rear portion of the base flange of the rim member.

Other objects and features of this invention will more fully appear from the following detailed description taken in connection with the accompanying drawings which illustrate several embodiments thereof, and in which:

Figure 1 is a side view, partly broken away, of a wheel construction embodying one form of my present invention;

Figure 2 is an enlarged fragmentary cross sectional view taken on line II—II of Figure 1 looking in the direction indicated by the arrows and showing the wheel mounted upon a suitable or conventional central support;

Figure 3 is an enlarged fragmenatry sectional view corresponding to an upper portion of the illustration of Figure 2 and showing clearly the cooperation of one form of my spring element with the members of the wheel;

Figure 4 is a fragmentary sectional view similar to Figure 3 illustrating a modification of the invention and showing a slightly different manner of securing the spring element to the ornamental member;

Figure 5 is a fragmentary sectional view corresponding to Figure 3 but illustrating another embodiment of the invention wherein a slightly different curved spring element is employed for holding the ring on the wheel;

Figure 6 is a fragmentary sectional view corresponding to Figure 3 and illustrating still another form of the invention wherein the spring elements bear against the wheel body and engage a rear portion of the base flange of the tire rim; and Figure 7 is a fragmentary sectional view similar to Figure 3 illustrating the final form of my invention and showing the springs as applied to a circular member of larger area than the circular rim members shown in the other modifications.

As shown in the drawings:

The reference character 10 designates generally an ornamental trim member or ring embodying the features of this invention, and which is illustrated as being applied to the outer side of an automobile wheel including the usual drop center type of tire rim member 11 and a body or hub member designated generally by the reference numeral 14. The rim member 11 includes the usual laterally projecting side flanges 13, as well as a base flange 12, at the bottom of the rim.

The wheel hub or body member 14 has the usual central wheel mounting flange 15 which, as is well known and as is illustrated in Figure 2, is adapted to be detachably bolted to a suitable wheel support.

The outer peripheral portion of the wheel body member 14 is adapted to be secured in any suitable manner, as by riveting or welding, to the base flange 12 of the rim and is provided with a plurality of spaced axially depressed sections 16 which define axially extending openings 17. These openings are referred to as being axially extending openings, for the reason that they extend in a direction paralleling the axis of the wheel. Also, it will be noted that while the wheel body member is illustrated as being provided with eight of these openings, it is, of course, contemplated that the number of openings may be reduced or increased as desired.

The trim ring 10 comprises a metallic annulus which may be made of any suitable material, such, for example, as sheet metal. I have obtained excellent results by making this ring of stainless steel, although it is, of course, to be understood that any other suitable material may be used as long as such material is ornamental or may be ornamented. For example, the external surface of the ring may be chromium plated or otherwise finished to enhance the appearance of the wheel to which the ring is applied.

This ring may be made in any suitable manner. One way to make it is to form it of strip stock and to weld its ends. Another way is to blank it from sheet metal and to turn its edges as shown.

The outer peripheral portion of the ring is turned back upon itself to form a turned edge 19 which is adapted to bear against one of the flanges of the wheel rim member. This arrangement is desirable in that it conceals the rough edge of the ring when the ring is applied to the wheel.

The other or inner peripheral margin of the ring has lock seamed to it a plurality of spaced retaining elements or springs 20, which may correspond in number to the number of openings 17 in the wheel body member 14 or may be of a lesser number as desired. Each of these spring elements 20 has one end formed into a turned portion 21, which is nested inside or interlocked with a turned inner edge 22 on the ring 10. The spring is of an outwardly bowed construction and has an angularly bent free end 23 adapted to be cammed over an inner edge or portion 18 of the depressed section 16 in the outer peripheral margin of the wheel body member 14. This camming action of the spring is effected upon the axial application of the wheel ring to the wheel.

In applying the ornamental member or trim ring 10 to the wheel, it is first placed over the outer side of the wheel and is then pressed in an axial direction. During this application, the ring elements 20 enter the openings 17 at the junction of the rim and body members, and the angular ends 23 of the springs slide over the bottom of these openings defined by the depressed sections 16 until such angular ends snap past the rear edges or portions 18 of the depressed sections 16. In this application of the ring to the wheel, the bowed portions of the springs 20 come to bear at 25 against the base flange 12, so that the springs are in reality backed up by the wheel rim and thus make contact with one wheel member while resiliently embracing the other to retain the ring on the wheel.

In Figures 4, 5, and 6, I have illustrated modifications of the ring structure shown in Figures 1 to 3. These modifications differ principally from the first described form in the character of the spring employed for retaining the ring on the wheel.

In Figure 4, the trim ring 10a cooperates with flanges 13a of a wheel rim member 11a secured to a body member 14a. The wheel ring 10a has its outer edge turned at 19a and has attached to its inner edge a plurality of axially extending spring elements 20a, similar to the spring elements 20, which extend through circumferentially spaced openings 17a defined by axially extending depressed sections 16a in the wheel body member 14a. Each of these spring elements 20a has an angularly bent free end adapted to retainingly overhang the rear edge portion 18a of the depressed section 16a, and has a bowed intermediate portion for contact with the base flange 12a of the rim member as indicated at 25a.

Each of these spring elements also has a laterally bent outer end, as indicated at 21a, which is clamped in place by a turned and flattened inner edge 22a on the ring 10a.

The operation and application of this ring to the wheel is similar to the one previously described.

In Figure 5, the ring 10b is disposed over the outer side of a wheel including a rim member 11b and a body member 14b. The outer edge of the ring 10b is turned as indicated at 19b for engagement with an outer side of one of the side flanges 13b of the wheel rim.

The inner edge of the wheel ring is turned as indicated at 22b and has suitably welded or riveted to it the curved ends 21b of a plurality of axially extending spring or resilient elements 20b. Each of these spring elements 20b has a turned free end 23b, which is turned inwardly back upon the main body of the spring element.

In this form of the invention, the spring element instead of being bowed in an intermediate portion thereof is provided with a straight portion parallel to the base flange 12b of the wheel rim, which is adapted to engage the inner surface of the base flange as indicated at 25b.

These spring elements extend through axially extending openings 17b in the outer peripheral margin of the wheel body member 14b, which openings are defined by depressed sections 16b in the wheel body member. Also, the free ends 23b of the spring elements are adapted to retainingly embrace the rear edge portions 18b of the depressed sections 17b.

The operation and application of this ring to the wheel is similar to that of the previously described embodiments.

In Figure 6, the ornamental wheel ring 10c has its outer peripheral margin formed into a turned edge 19c for contacting an outer surface of one of the flanges 13c of the wheel rim member 11c.

The inner peripheral edge or margin 22c of the ring 10c is curved and has secured to it the curved ends 21c of a plurality of axially extending resilient or spring elements 20c. These elements extend axially through circumferentially spaced openings 17c in the peripheral margin of the wheel body member 14c, which openings are defined by depressed sections 16c in the wheel body member.

Each of these spring elements has its free end bent into an angular portion designated by 23c, which is adapted to retainingly grip at 18c the rear side or portion of the base flange 12c of the rim member 11c. With the exception of this difference, this form of the invention is substantially similar to the first described form.

In Figure 7, my invention is illustrated as being applied to an ornamental member of greater cross sectional area than the rings illustrated in the other forms of the invention. The ornamental member 10' is of such configuration as to extend over the wheel body member 14' so as to conceal the same and may, if it is so desired, be provided with a centrally disposed hub cap. However, it is preferably formed so as to extend clear across the wheel body member, whether it has formed integrally with it a centrally disposed hub cap or one that is detachable therefrom as disclosed in previously issued patents granted to myself.

The ornamental member 10' has an outer turned edge 19' adapted to contact and bear against the flange 13' of the wheel rim member 11'. Also secured to the rear side of the circular ornamental member 10' and projecting rearwardly therefrom are a plurality of spaced axially extending spring elements 20', each of which has a curved portion 21' secured at 22' to the member 10'.

Each of these spring elements is bowed inwardly in a direction away from the base flange 12' so as to embrace the depressed section 16' formed in the wheel body member 14'. As noted before in connection with the other forms of my invention, there are a plurality of these depressed sections 16' and they serve to define axially extending openings 17'.

Each of the spring elements 20' has its free end formed into an angular portion 23' which is adapted to retainingly engage the rear side or edge 18' of the base flange 12' of the rim member 11'.

In applying this ornamental member 10' to the wheel, it is pressed axially into position during which action the spring elements pass through the openings 17' as in the other forms of my invention. In this form of the invention, as in my previously described form of Figure 6, the spring elements are bowed inwardly instead of outwardly and are engaged with the depressed section of the wheel body member instead of with the base flange 12'. Thus these elements bear against the wheel body member but resiliently grip the rim member to hold the ornamental member 10' in position on the wheel.

In all forms of my invention it will be perceived that I have provided an ornamental circular member for disposition over an outer side of the wheel and which has a plurality of axially extending spring elements which project through spaced openings in the wheel body member at the junction of that member and the rim member. These openings not only accommodate the spring elements but permit air to circulate therethrough for the purpose of cooling the brake drum. The spring elements in all forms of the invention bear against one member of the wheel and resiliently grip the other to hold the ornamental member on the wheel.

I claim as my invention:

1. In a wheel construction including a wheel having rim and body members, said rim including a plurality of radial flanges and a base flange, and said body member including a plurality of spaced apertures at its junction with the rim member, an ornamental trim ring for the rim member having its inner marginal portion provided with a plurality of spaced resilient fingers extending through said apertures and embracing an inner and concealed edge of one of said members for retaining the ring on the wheel, said fingers being adapted to be snapped into retaining engagement upon application of the ring in an axial direction to the wheel, each of said fingers having an intermediate portion for bearing against the other wheel member whereby said fingers are wedged between the two members.

2. In a wheel construction including a wheel having rim and body members, the rim member including a base flange and the body member having a plurality of circumferentially spaced openings in its outer peripheral portion adjacent the base flange, an ornamental trim member for application over an outer side of the wheel adjacent said junction comprising a metallic circular member provided with a plurality of rearwardly extending flexible fingers secured thereto and of such length as to extend substantially through said openings in the wheel body member for engagement with a concealed and rear portion of the base flange of the wheel rim to retain the ornamental member on the wheel, each of said fingers including an intermediate bowed portion adapted to bear against and be backed by the portion of the wheel body member defining the bottom of the cooperating opening.

3. As an article of manufacture, an ornamental trim member for application to the outer side of a wheel having rim and body members, the rim member including a base flange and the body member having a plurality of circumferentially spaced axially extending openings in its outer peripheral portion adjacent the base flange, said trim member comprising a circular metallic member provided with a plurality of rearwardly extending flexible fingers secured at circumferentially spaced points to an inner margin of the member and of such length as to extend substantially through the openings in the wheel body member, each of said fingers comprising a bowed element having an intermediate portion for bearing against one of the wheel members so as to be backed up thereby and having a flexible end portion for retaining engagement with the other wheel member upon the ornamental member being pressed axially into position on the wheel.

4. As an article of manufacture, a wheel trim for disposition over the junction of a tire rim member and a wheel body member of a wheel and for cooperation with spaced openings in the body member adjacent said junction, said trim comprising a circular element of curved cross sectional shape having its outer edge of such diameter as to be adapted to overlap a flange of the rim member, and a plurality of spring retaining fingers connected to said element and extending rearwardly from said element radially inward of said outer edge, said fingers being circularly spaced from each other so as to be adapted to be aligned with and to fit into said openings, each of said fingers including an intermediate portion for bearing against one of said wheel members in one of said openings and a freely flexible end portion for retaining cooperation with the other wheel member, said intermediate portion being of such construction and arrangement as to back up the flexible end portion in its application of a retaining pressure to the wheel whereby pressure may be applied in opposite directions by each element to both of said wheel members.

5. As an article of manufacture, a wheel trim for disposition over the junction of a tire rim member and a wheel body member of a wheel and for cooperation with spaced openings in the body member adjacent said junction, said trim comprising a circular element of curved cross sectional shape having its outer edge of such diameter as to be adapted to overlap a flange of the rim member, and a plurality of spring retaining fingers connected to said element and extending rearwardly from said element radially inward of said outer edge, said fingers being circularly spaced from each other so as to be adapted to be aligned with and to fit into said openings, each of said fingers including an intermediate portion for bearing against one of said wheel members in one of said openings and a freely flexible end portion for retaining cooperation with the other wheel member, said intermediate portion being of such construction and arrangement as to back up the flexible end portion in its application of a retaining pressure to the wheel whereby pressure may be applied in opposite directions by each element to both of said wheel members, said intermediate portion being bowed in an opposite direction from that in which the end portion extends and having a surface for bearing against one of said members in a radial direction inside of the corresponding wheel opening.

GEORGE ALBERT LYON.